Figure 1:
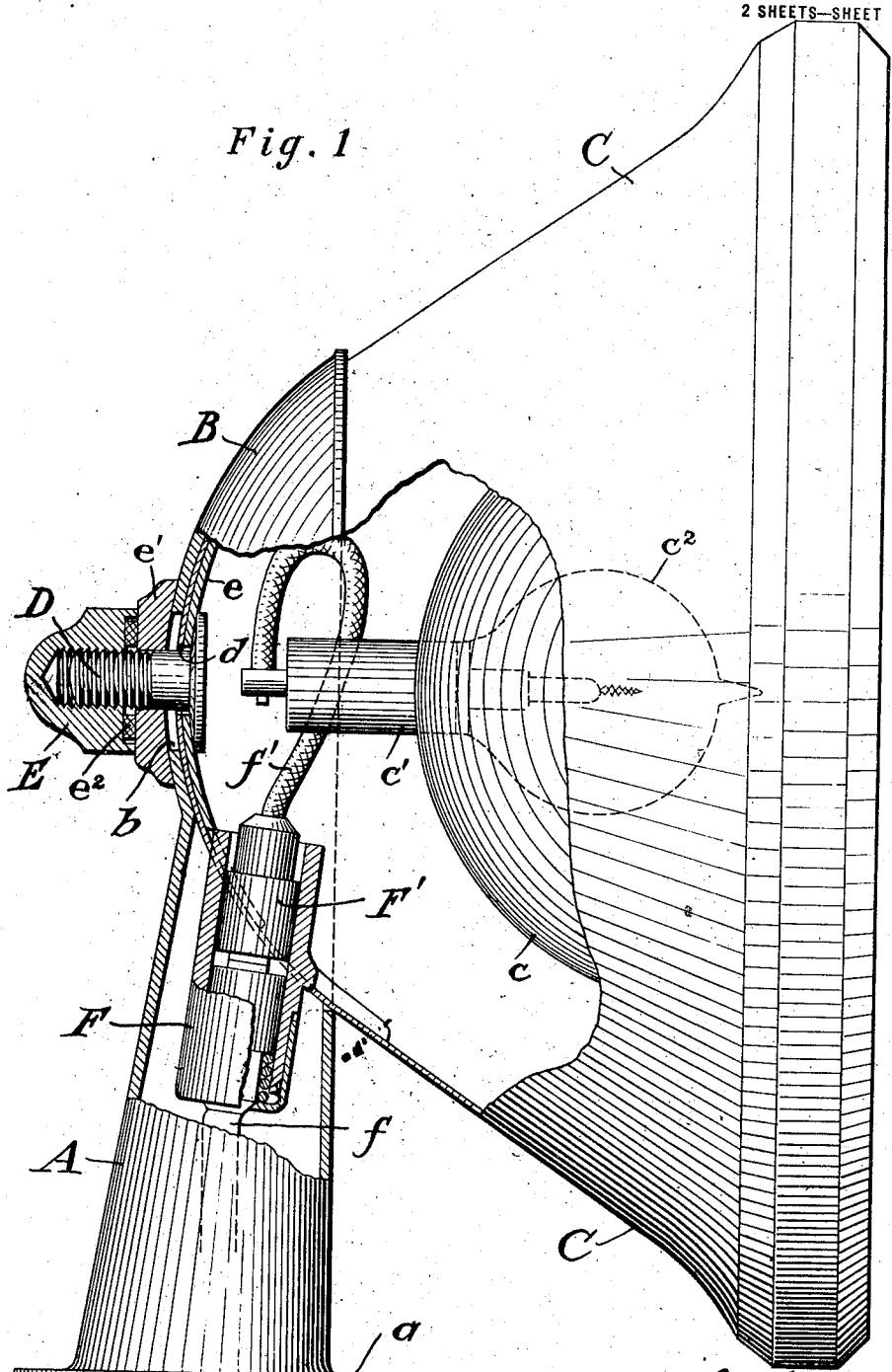

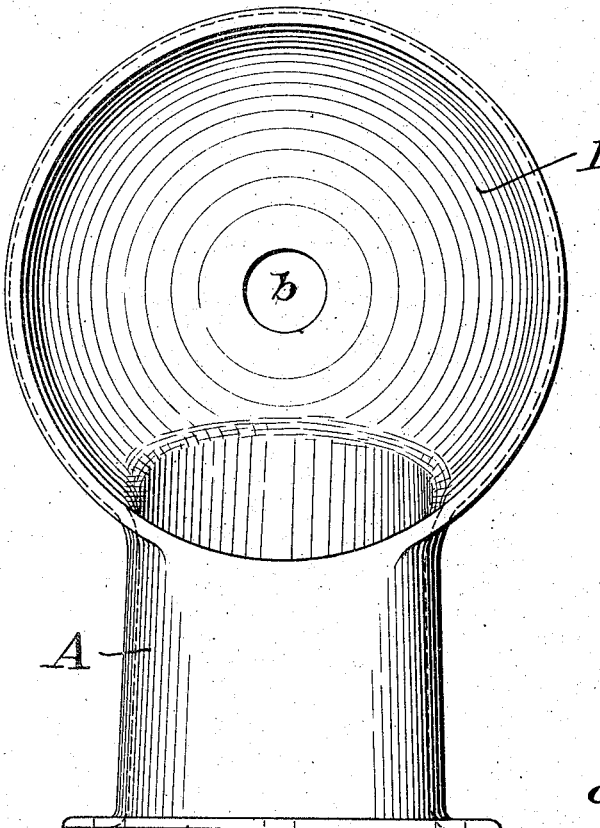
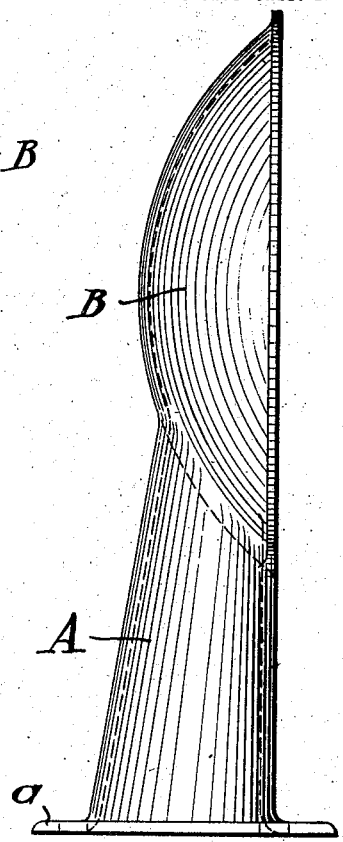
Fig. 2   Fig. 3
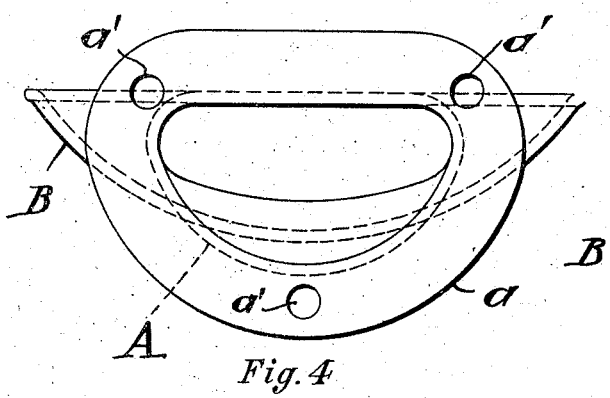
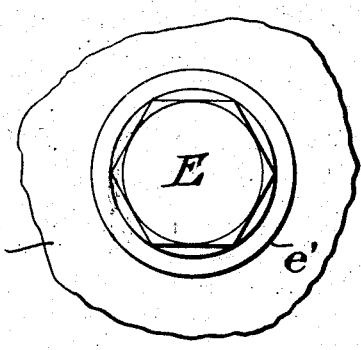
Fig. 4   Fig. 5

UNITED STATES PATENT OFFICE.

OWEN RAY SKELTON, OF DETROIT, MICHIGAN, ASSIGNOR TO THE STUDEBAKER CORPORATION, A CORPORATION OF NEW JERSEY.

LAMP SUPPORT AND REFLECTOR.

1,193,724.      Specification of Letters Patent.      Patented Aug. 8, 1916.

Application filed February 29, 1916. Serial No. 81,089.

*To all whom it may concern:*

Be it known that I, OWEN RAY SKELTON, a citizen of the United States of America, and resident of Detroit, in the county of Wayne and State of Michigan, have invented certain new and useful Improvements in Lamp Supports and Reflectors, of which the following is a specification.

This invention is a lamp support and reflector, and the object of the invention is to provide a device of this class which, when mounted on a motor vehicle, will be adjustable so that the rays emanating from the reflector of the lamp may be cast in any desired direction.

A common drawback in automobile lamps, as generally constructed, resides in the fact that they are difficult to adjust when once in position on a vehicle, and, as maximum efficiency of the lamps can only be gained by their proper inclination and adjustment to direction, it is desirable that the lamp construction be such that adjustment of the lamp may be made at will, in a simple and efficient manner, and without the necessity of complicating the parts or adding to the expense of manufacture of lamps as now made.

In the preferred embodiment of this invention, a rigid support is provided which is adapted to be secured, in any suitable manner, to a vehicle, and with this rigid support coöperates a lamp and reflector which are incased in a suitable housing. The housing and support are shaped to coöperate with one another so that the housing may be moved relative to the fixed support, but may be locked in any of its many positions by simple and convenient means. The wiring to the lamp and all of the adjuncts associated therewith are concealed within the support and housing, and the organization of the parts is such that a very compact and sightly structure is produced, which is, in itself, of marked simplicity.

Features of the invention, other than those specified, will be apparent from the hereinafter detailed description taken in conjunction with the accompanying drawings.

In the accompanying drawings I have illustrated one practical embodiment of the invention, but the construction shown therein is to be understood as illustrative, only, and not as defining the limits of the invention.

Figure 1 is a side elevation of a lamp support and reflector embodying the present invention. In said figure, certain parts are shown in central section in the interest of clearness. Figs. 2 and 3 are front and side elevations, respectively, of the supporting standard alone. Fig. 4 is an underneath plan view of the supporting standard detached, and Fig. 5 is a fragmental, rear elevation showing the means for locking the reflector in fixed position on the supporting standard.

Referring to the drawings, A designates a hollow or tubular supporting standard, provided at its base with a flange $a$, by means of which the standard may be readily secured in fixed position on a motor vehicle by suitable means, such as bolts or screws passing through apertures $a'$. The upper portion B of standard A is dished or concave, *i. e.*, curved or rounded in the manner of the surface of a sphere when viewed from its center, whereby it is adapted to serve as a seat for the base of a correspondingly shaped lamp and reflector housing C, as shown in Fig. 1.

With the parts coöperating as specified, the dished portion B of the standard serves as a bearing or seat for reflector C, and said reflector may be shifted about in its seat because of the engagement of the coöperating, correspondingly shaped, curved surfaces. The reflector is, however, normally held in a predetermined position in engagement with its seat by means of a bolt D which passes through an aperture $d$ in the rear of housing C, through an aperture $b$ in the part B of the standard, and adapted to be engaged by a nut E exterior and to the rear of member B. A washer plate $e$ is interposed between the head of bolt D and the interior of housing C so as to distribute the strain placed upon said housing by the bolt, and intermediate nut E and the exterior of portion B is positioned a washer $e'$ for the same purpose. Bolt D is preferably recessed to receive a gasket $e^2$ of leather, rubber or the like, so that, when nut E is screwed into position, it will not be apt to work loose, as the friction between gasket $e^2$ and the abutting face of washer $e'$ will adequately preclude such loosening. Thus, when the bolt and nut are in coöperative engagement, with the nut in its tightened position, such tightening of the nut will cause the exterior surface of housing C to engage with the interior dished surface of the seat portion B with such a high degree of friction as to adequately preclude relative movement of the parts. To allow of the adjustment of housing C relative to standard A, however, the aperture or hole $b$ at the back of the dished portion B is made somewhat larger than the diameter of bolt D, with the result that, when nut E is loosened, housing C may be rotated within its seat to properly adjust the position of said housing. This movement which the housing may partake of is only limited by the size of the aperture $b$ in the seat B, and, accordingly, the size of such aperture determines the degree of adjustment to which the lamp is susceptible.

Reflector housing C has mounted interior thereof a reflector $c$, and upon reflector $c$ is mounted a lamp socket $c'$ adapted to receive a lamp $c^2$. Socket $c'$ is secured to reflector $c$ in such manner that lamp $c^2$, when positioned in its socket, will be in the center of curvature or in the focus of reflector $c$. The position of the socket relative to the reflector is determined at the time of making the lamp, and is fixed thereafter so that the relation between the source of light and the reflecting surface cannot be varied by an amateur, but will always remain correct.

Mounted on housing C of the reflector, and so positioned thereon as to extend downwardly into the hollow base of support A, is a second socket or plug F, to which current for the lamp is led through a cable $f$. With socket F coöperates a plug F' secured to the end of a cable $f'$ leading to socket $c'$ of the lamp. It will be noted that all of the electrical connections to the lamp are concealed within housing C and standard A, and, accordingly, they do not form unsightly projections, as is frequently the case in lamps. Moreover, they are so constructed and arranged that, when initially installed and connected, they will not get out of order or become disconnected.

When automobile lamps are either mounted, or frequently become, out of adjustment, the degree of adjustment necessary to bring them back into correct position is not great, since, as a general rule, a very minute movement of the reflector is sufficient to true-up or correct the discrepancy. Accordingly, in the structure as shown in the drawings, the lamp and its support are shown as adapted for only comparatively slight relative movement, as such slight movement is, in all cases, more than is necessary to bring about the desired result. E. g., assuming that an automobile, when standing on a street, throws the rays of one of its lamps upon the sidewalk, instead of directly upon the road, it is desirable to so adjust the faulty lamp that the rays of light from both lamps will preferably intersect at some distant point forwardly of the machine. The chauffeur, noticing that one of his lamps is out of adjustment, can readily correct the difficulty by loosening nut E and turning casing C perhaps two or three degrees nearer the other light, and again tightening nut E to lock the parts in place. The correcting of the discrepancy requires only a few seconds, and is more than worth while because of the advantage gained by having the lamps properly adjusted for fast and sure driving, particularly along country roads where the chauffeur must depend entirely upon his "finders" for a view of the road.

One important, practical advantage of adjusting the reflector, its housing and its lamp bodily, is the fact that no matter into what position housing C may be moved, lamp $c^2$ will always be in proper position relative to the reflector. It is well understood that, to gain maximum efficiency in the reflecting of light, the source of light should be at the center of curvature or focus of the reflector. Accordingly, in lamps wherein either the reflector or source of light is moved relative to the other, to determine the adjustment of the lamp, it is very seldom that an amateur, in making the adjustment, will leave the lamp and its reflector in their proper coöperative relations. With the present invention, however, the vital parts of the lamp are fixed relative to one another and are moved together as described, so that maximum efficiency of the dispensation of light is not altered during the manipulations of adjusting the lamp as a whole.

Another feature of advantage in this invention is the fact that all of the electrical connections to the lamp are concealed. They do not, therefore, detract from the esthetic appearance of the lamp, and, at the same time, are so positioned that they cannot be tampered with by inexperienced persons. Lastly, the simplicity of the structure, taken in conjunction with the simple manner in which it may be adjusted and locked against inadvertent movement, make the device of the present invention highly meritorious and efficient as a lighting medium for motor vehicles.

While it is primarily intended for motor vehicles, the present invention is not restricted to such environment, as it is, manifestly, adapted for a broader field of use, such, e. g., as on motor-boats or other uses where an adjustable lamp is desirable or advantageous.

Having thus fully described the inven- tion, what I claim as new, and desire to secure by Letters Patent, is:

1. A device of the class described embodying a standard provided with a concave portion having an aperture, a lamp housing shaped to conform to and engage with the concave portion of the standard and provided with a threaded stem extending through the aperture in said portion, said aperture being larger than the stem whereby the housing may be oscillated about the center of curvature of the concave portion, while in engagement with said portion, and a threaded member coöperating with the stem for locking the housing against such movement.

2. A device of the class described embodying a supporting member adapted to be mounted in fixed position and provided with a concave portion, a lamp housing shaped to conform to and engage with the concave portion of the supporting member whereby the housing may be oscillated about the center of curvature of the concave portion while in face engagement therewith, and means for clamping the housing and concave portion together in face engagement to preclude such oscillation.

3. A device of the class described embodying a supporting member adapted to be mounted in fixed position and provided with a concave portion, a lamp housing shaped to conform to and engage with the concave portion of the supporting member whereby the housing may be oscillated about the center of curvature of the concave portion while in engagement therewith, and means for locking the housing against relative movement to the concave portion, with the concave and convex faces of the respective parts in engagement with one another.

4. A device of the class described embodying a lamp housing, a portion of which is convex, which housing is provided interiorly with a reflector and a lamp mounted in fixed position relative thereto, in combination with a fixed support provided with a concave portion complementary to the convex portion of the housing, and means for normally locking the housing to the support against relative movement, with their complementarily shaped portions in engagement with one another, said means being operable to allow of angular adjustment of the lamp housing.

5. A device of the class described embodying a fixed support having a concave portion provided with an aperture, a lamp housing shaped to conform to said concave portion and seated therein, with the concave and convex faces of the respective parts in engagement with one another, a bolt passing through an aperture in the housing and extending through the aperture in the concave portion, and a nut on said bolt for locking the lamp housing against movement on its support.

6. A device of the class described embodying a lamp housing, a portion of which is convex, and a projection extending exteriorly of the housing at the convex portion thereof, in combination with a fixed support provided with a concave portion in which is seated the complementary convex portion of the housing, with the concave and convex faces of the respective parts in engagement with one another and with the projection of the lamp housing extending through an aperture, of greater area than the projection, formed in the concave portion, whereby the housing may be oscillated about the common center of curvature of the complementary curved surfaces to secure angular adjustment, and means coöperating with the projection for locking the housing against movement to the fixed support.

7. A device of the class described embodying a housing, a portion of which is convex, and interiorly of which housing is a reflector, and an electric lamp mounted in fixed position relative thereto, in combination with a fixed, hollow standard provided with a concave portion complementary to the convex portion of the housing, means for normally locking the housing to the standard against relative movement, with the complementary curved surfaces in engagement, and electrical connections for the lamp, said connections being housed in concealed positions within the hollow standard and interiorly of the lamp housing.

8. A device of the class described embodying a housing, a portion of which is convex, and interiorly of which housing is a reflector, and an electric lamp mounted in fixed position relative thereto, in combination with a hollow standard, one end of which is fixedly secured to a support and the other end of which is provided with a concave portion complementary to the fixed portion of the housing, means for normally locking the housing to the standard against relative movement, with the complementary curved surfaces in engagement, and electric connections for the lamp, said connections being housed in concealed positions within the hollow standard and interiorly of the lamp housing.

Signed by me at Detroit, Michigan, this 26th day of February 1916.

OWEN RAY SKELTON.

Witnesses:
ROY C. GAMBLE,
R. E. SCRATCH.